US010878104B2

(12) United States Patent
Sullivan et al.

(10) Patent No.: US 10,878,104 B2
(45) Date of Patent: Dec. 29, 2020

(54) AUTOMATED MULTI-CREDENTIAL ASSESSMENT

(71) Applicant: MICRO FOCUS LLC, Santa Clara, CA (US)

(72) Inventors: Gerald Sullivan, Alpharetta, GA (US); Sasi Siddharth Muthurajan, Cambridge, MA (US); Nidhi Kejriwal, Sunnyvale, CA (US); Jeremy Brooks, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/775,324

(22) PCT Filed: Nov. 13, 2015

(86) PCT No.: PCT/US2015/060568
§ 371 (c)(1),
(2) Date: May 10, 2018

(87) PCT Pub. No.: WO2017/082920
PCT Pub. Date: May 18, 2017

(65) Prior Publication Data
US 2018/0349613 A1 Dec. 6, 2018

(51) Int. Cl.
*G06F 11/00* (2006.01)
*G06F 12/14* (2006.01)
(Continued)

(52) U.S. Cl.
CPC .......... *G06F 21/577* (2013.01); *G06F 21/554* (2013.01); *G06F 21/629* (2013.01)

(58) Field of Classification Search
USPC .......................................................... 726/25
See application file for complete search history.

(56) References Cited

U.S. PATENT DOCUMENTS 7,237,265 B2 * 6/2007 Reshef .................. G06F 21/554
726/25
7,814,075 B2 10/2010 Sack et al.
(Continued)

OTHER PUBLICATIONS

International Searching Authority., International Search Report and Written Opinion dated Aug. 5, 2016 for PCT Application No. PCT/US2015/060568, Filed Nov. 13, 2015, 12 pages.
(Continued)

*Primary Examiner* — Wasika Nipa
*Assistant Examiner* — Samuel Ambaye

(57) ABSTRACT

Examples relate to automated multi-credential assessment in a system. One example enables auditing an application by sending a first request for an action to be performed in the application, the first request based on a first privilege level, where the first privilege level corresponds with a first level of access to the application, and sending a second request for the action to be performed in the application, where the second request based on a second privilege level different from the first privilege level. The second privilege level may corresponds with a second level of access to the application different from the first level of access. The first request and second request may be performed, and the results of the performed first request and second request may be combined. The combined results may be made available.

20 Claims, 2 Drawing Sheets

(51) Int. Cl.
*G06F 12/16* (2006.01)
*G08B 23/00* (2006.01)
*G06F 21/57* (2013.01)
*G06F 21/55* (2013.01)
*G06F 21/62* (2013.01)

(56) References Cited

U.S. PATENT DOCUMENTS

| | | |
|---|---|---|
| 8,370,929 B1 | 2/2013 | Pennington et al. |
| 8,566,945 B2 | 10/2013 | Sima |
| 8,656,495 B2 | 2/2014 | Sima et al. |
| 8,800,042 B2 | 8/2014 | Sima et al. |
| 2003/0200172 A1 | 10/2003 | Randle et al. |
| 2009/0271863 A1* | 10/2009 | Govindavajhala .... G06F 21/577 726/23 |
| 2014/0123295 A1 | 5/2014 | Kuykendall et al. |
| 2014/0245460 A1 | 8/2014 | Sum et al. |

OTHER PUBLICATIONS

Martin, B., et al., Web Application Scanning with Nessus, Sep. 6, 2013, Tenable Network Security, Rev. 5, 18 pages.

\* cited by examiner

AUTOMATED MULTI-CREDENTIAL ASSESSMENT

BACKGROUND

Systems scan applications to determine vulnerabilities. Applications may be accessed via different roles and privileges, where a user with a first role has a different access of the application than a second user with a second role.

BRIEF DESCRIPTION OF THE DRAWINGS

The following detailed description references the drawings, wherein.

DETAILED DESCRIPTION

Figure 1:
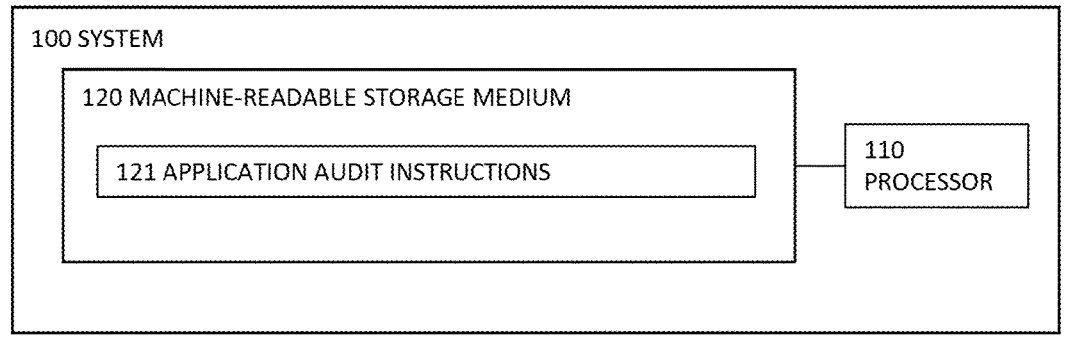
FIG. 1 is a block diagram of an example system for automated multi-credential assessment.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As mentioned above, systems scan applications to determine vulnerabilities. Applications may be accessed via different roles and privileges, where a user with a first role has a different access of the application than a second user with a second role.

Often, systems that act as application scanners detect vulnerabilities in an application when logged into the application as a single user with a single role. That role may be associated a privilege level that defines the level of access into the application that the user has. The level of access may include links that a user of that role may access, functionality that may be accessed, web pages that may be accessed, files, registry items, memory resources allocated to the application, and/or other resources of the application that a user with that role may access.

A system that acts as an application scanner may have to scan the application multiple instances, with each instance corresponding to a different role that may be available via the application. Numerous technical challenges exist with this approach. Requiring multiple different scans may cause issues with determining attacks that take advantage of compromising a role in an application. Further, it may be difficult to seamlessly integrate the multiple different scans into a single workflow that shows the various different vulnerabilities that the application might have.

A new technical solution to this challenge involves automated multi-credential assessment. In particular, an example system that uses automated multi-credential assessment may facilitate scanning of new categories of vulnerabilities based on access via different roles and privilege levels by performing automated multi-credential vulnerability assessment of an application that comprise multiple roles via which to access the application. The automated multi-credential vulnerability assessment of an application may comprise implicitly performing multiple, separate scans per privilege level in an application which are then merged and presented as a single scan to provide a complete view of the application's attack surface and vulnerabilities.

As mentioned above, an application may have a set of privilege levels which may be afforded to users of various roles. For example, each role may be associated with a corresponding privilege level. A first privilege level may afford more comprehensive access to an application that a second privilege level. In some examples, the privilege level may include information about links that a user of that role may access, functionality that may be accessed, web pages that may be accessed, and/or other resources of the application that a user with that role may access. In some examples, a non-transitory machine-readable storage medium may store information related to each resource (e.g., hardware resource, functionality, link, web page, and/or other resource of the application), and each privilege level of the application may indicate which of the resources it has access to.

A system that performs automated multi-credential assessment may have access to an application (e.g., via APIs that access the application) and may perform functionality based on the application running. For example, the system may crawl the application to determine an attack surface of the application and may then audit the application to determine any vulnerabilities in the application.

The system may crawl the application by taking on a role in the application and performing all functionality available to a user in that role, based on the privilege level associated with that role. The system may be aware of the available privilege levels for the application, the resources of the application, and/or other information needed to perform automated multi-credential assessment of the application. In some examples, the system may comprise or have accessible a non-transitory machine readable storage medium that stores the privilege levels, resources, and/or other information.

The system may crawl the application by performing separate crawls of the application for each privilege level and may determine the resources that are accessible in each privilege level. Based on performing crawls for each privilege level, the system may determine the attack surface of the application. An attack surface may comprise, for example, all accessible resources in the application, regardless of privilege level of the application. In some examples, the attack surface may be delineated based on privilege level (e.g., by providing information about all accessible resources at each privilege level as well as all accessible resources of the application).

In some examples, the crawls of the application can be performed in parallel or may be performed sequentially, In some examples, the crawls may be performed sequentially (e.g., in order from a role of the lowest privilege level to the highest privilege level, and/or in any other order). As may be seen later, performing crawls in order from lowest to highest privilege level may help in determining vulnerabilities that attack multiple credentials.

Responsive to crawling the application, the system may then audit the application. Auditing the application involves sending attacks to the application to detect web application vulnerabilities. For example, the system may send requests to perform a set of actions in the application, where each action could comprise a different potential attack against the application. The attacks could comprise injection attacks, search attacks, privilege escalation attacks, and/or other types of attacks.

An injection attack may comprise an attack performed on an attack surface detected during the crawl phase. In some examples, an injection attack may comprise an attempt to store malicious information in a memory allocated to the application. It may be performed once per request regardless of the privilege level used in sending the request to perform the attack. Responsive to determining that the injection attack is successful, then an indication of a vulnerability of the injection attack for that resource may be noted.

A search attack may comprise a search for resources that were not part of the original crawl for that privilege level (e.g., hidden backup files, configuration files, and/or other resources). A search attack may be performed once per privilege level. Responsive to determining that a resource is accessed at a privilege level at which it should not be accessible, then an indication of a vulnerability of a search attack for that resource may be noted.

A privilege escalation attack may comprise an attack that access a resource accessible to a user of a first privilege level using a second privilege level that may not be able to access that resource. For example, a privilege escalation attack may be performed at a first privilege level. Another privilege escalation attack may be performed sequentially or in parallel at a second privilege level that is lower than the first privilege level, to determine whether a resource accessible via the first privilege level and not the second privilege level may be accessed via a privilege escalation attack at the second privilege level. Responsive to determining that the request of performed validly at the second privilege level (e.g., the resource is accessed), then an indication of a vulnerability of a privilege escalation attack for that resource may be noted.

Other types of attacks may also be performed as part of the audit process, and the attacks requested and performed by the system are not limited to the examples described herein.

In some examples, responsive to the system auditing the application, the system may combine the results of the performed requests for action (e.g., the attacks sent to the application) and may make available the results.

Referring now to the drawings, FIG. 1 is a block diagram of an example system 100 for automated multi-credential assessment. In the example depicted in FIG. 1, system 100 includes a non-transitory machine-readable storage medium 120 and a processor 110.

Referring now to the drawings, FIG. 1 is a block diagram of an example system 100 for automated multi-credential assessment. System 100 may comprise a cloud server, a mainframe, notebook, desktop, tablet, workstation, mobile device, and/or any other device suitable for executing the functionality described below. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, and/or other instructions to enable automated multi-credential assessment, as described below. As an alternative or in addition to retrieving and executing instructions, processor 110 may include one or more electronic circuits comprising a number of electronic components for performing the functionality of one or more of instructions 121 and/or other instructions.

In one example, the program instructions 121, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Non-transitory machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for automated multi-credential assessment. As detailed below, storage medium 120 may maintain and/or store the data and information described herein.

For example, storage medium 120 may maintain and/or store data and information related to automated multi-credential assessment. Storage medium 120 may store, for example, information related to a set of resources of the application, a set of roles via which the application may be accessed, a set of privilege levels, where each privilege level is associated with a predetermined role, an order of privilege levels (e.g., from lowest privilege level with a least amount of access to resources of the application to a highest privilege level with the highest amount of access to resources of the application), a set of attacks to be performed at each privilege level, a set of expected results for each attack performed at each privilege level, and/or other information related to automated multi-credential assessment of the application.

Application auditing instructions 121, when executed by processor 110, may perform automated multi-credential assessment of an application by auditing the application. In some examples, the application auditing instructions 121, when executed by processor 110, may audit the application by sending a set of request for action to be performed in the application. The set of requests for action may comprise the set of attacks for each privilege level in the application. The application auditing instructions 121, when executed by processor 110, may determine the set of requests for action to be performed in the application based on information stored in the non-transitory machine readable storage medium 120.

In some examples in which the set of requests for action are sent, the application auditing instructions 121, when executed by processor 110, may audit the application by sending a first request for action to be performed in the application. The first request may comprise a request to perform an attack on the application and may be based on a first privilege level that corresponds with a first level of access to the application. The application auditing instructions 121, when executed by processor 110, may audit the application by also sending a second request for the same action to be performed in the application. The second request may comprise a request to perform the same attack on the application and may be based on a second privilege level that corresponds with a second level of access to the application that is less comprehensive than the first level of access. In some examples, application auditing instructions 121, when executed by processor 110, may send the second request responsive to sending the first request. For example, the application auditing instructions 121, when executed by processor 110, may send the second request responsive to determining that the first request should be sent. In some examples, the application auditing instructions 121, when executed by processor 110, may send the first request responsive to sending the second request. For example, the application auditing instructions 121, when executed by processor 110, may send the first request responsive to determining that the second request should be sent.

The application auditing instructions 121, when executed by processor 110, may perform the first request and the second request. In some examples, the application auditing instructions 121, when executed by processor 110, may perform the second request responsive to performing the first request.

In some examples, the first request may comprise an injection attack, and the application auditing instructions 121, when executed by processor 110, may perform the first request for each privilege level of the application in parallel or sequentially.

In some examples, the first request may comprise a privilege escalation attack, and the application auditing instructions 121, when executed by processor 110, may perform the first request and may then determine whether the first request is associated with a privilege level that has a lower level of access to resources of the application than the first privilege level. For example, the application auditing instructions 121, when executed by processor 110, may determine whether the first request is associated with the privilege level based on information stored in the non-transitory machine readable storage medium 120. Responsive to the first request not being associated with the privilege level, the application auditing instructions 121, when executed by processor 110, may perform the first request at the privilege level.

Responsive to performing the first request at the privilege level, the application auditing instructions 121, when executed by processor 110, may include an alert in the results of the performed first request that the first request was performed at the privilege level. The application auditing instructions 121, when executed by processor 110, may also determine whether the first request is validly performed at the privilege level. For example, the application auditing instructions 121, when executed by processor 110, may determine that the first request is being validly performed at the privilege level responsive to accessing a resource needed to be accessed to perform the first request, where the accessed resource should not be accessible at the privilege level. Responsive to the first request being validly performed at the privilege level, the application auditing instructions 121, when executed by processor 110, may also include an alert in the results of the performed first request that the first request was validly performed at the privilege level, that the resource was accessed at the privilege level, and/or other information related to performing the request at the privilege level.

The application auditing instructions 121, when executed by processor 110, may combine the results of the performed requests (e.g., the performed first request and second request). For example, for each request performed, the application auditing instructions 121, when executed by processor 110, may determine the results of the request based on whether the request was validly performed. In some examples, the application auditing instructions 121, when executed by processor 110, may determine if the request was validly performed by comparing the output received from the application based on the performed request with information stored in the non-transitory storage medium 120 that relates to the request. In some examples, responsive to the information not matching, the application auditing instructions 121, when executed by processor 110, may determine that the request was validly performed. In some examples, responsive to the request being validly performed, the application auditing instructions 121, when executed by processor 110, may determine that a vulnerability exists with performing that request at the associated privilege level.

For each request, the application auditing instructions 121, when executed by processor 110, may provide a result that comprises information about the request, information about the privilege level at which the request was performed, information about whether the request was performed with other same requests at different privilege levels, information about whether the request was validly performed, information about whether a vulnerability exists that is related to the request performed at that privilege level, information about resources accessed during performance of the request, any combination thereof, and/or other information related to performance of the request.

The application auditing instructions 121, when executed by processor 110, may make available the combined results of the performed requests. The application auditing instructions 121, when executed by processor 110, may make available the combined results via a report, via a graphic display comprising information about the requests performed and combined results, via email and/or other digital communication method, and/or in other manners. The manner in which the information is made available is not limited to the examples described herein.

In some examples, the application auditing instructions 121, when executed by processor 110, may crawl the application before auditing the application. The application auditing instructions 121, when executed by processor 110, may crawl the application by performing a separate crawl of the application for each privilege level of the application. In some examples, the application auditing instructions 121, when executed by processor 110, may perform the separate crawls of the application for each privilege level in order from a lowest privilege level to a highest privilege level.

Figure 2:
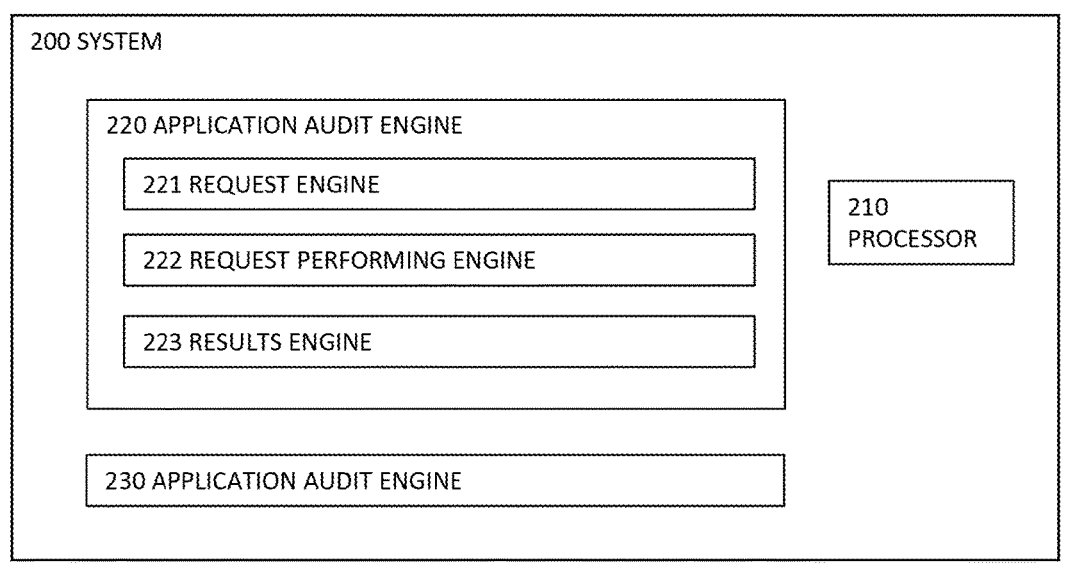
FIG. 2 is a block diagram of an example system for automated multi-credential assessment.

FIG. 2 is a block diagram of an example system 200 for automated multi-credential assessment. As with system 100, system 200 may comprise a cloud server, a mainframe, notebook, desktop, tablet, workstation, mobile device, and/or any other device suitable for executing the functionality described below. As with processor 110 of FIG. 1, processor 210 may be one or more CPUs, microprocessors, and/or other hardware devices suitable for retrieval and execution of instructions. The non-transitory machine readable storage of FIG. 2 may be the same as or similar to the storage medium 120 of FIG. 1. Non-transitory machine-readable storage medium of FIG. 2 may maintain and/or store data and information related to automated multi-credential assessment. The storage medium of FIG. 2 may store, for example, a set of resources of the application, a set of roles via which the application may be accessed, a set of privilege levels, where each privilege level is associated with a predetermined role, a set of attacks to be performed at each privilege level, and/or other information related to automated multi-credential assessment of the application. In some examples, the information stored by non-transitory machine-readable storage medium may be the same as or similar to information stored by non-transitory machine-readable storage medium 120

As detailed below, system 200 may include an engine 220 for automated multi-credential assessment. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Application auditing engine 220 may audit the application. In some examples, application auditing engine 220 may crawl the application before auditing the application. In some examples, the application auditing engine 220 may audit the application in a manner the same as or similar to that of the application auditing instructions 122 of system 100. Further details regarding an example implementation of application auditing engine 220 are provided above in connection with application auditing instructions 121 of FIG. 1.

In some examples, auditing engine 200 may comprise a series of engines 221-223. For example, auditing engine may comprise request engine 221, request performing engine 222, results engine 223, and/or other engines that may perform automated multi-credential assessment of an application.

Request engine 221 may send a set of requests to be performed in the application at various privilege levels. The set of requests for action may comprise the set of attacks for each privilege level in the application. Request engine 221 may determine the set of requests for action to be performed in the application based on information stored in the non-transitory machine readable storage medium. For example, request engine 221 may send a first request for an action to be performed in the application, the first request based on a first privilege level, wherein the first privilege level corresponds with a first level of access to the application. Request engine 221 may also send a second request for the action to be performed in the application, the second request based on a second privilege level different from the first privilege level, wherein the second privilege level corresponds with a second level of access to the application that is less comprehensive than the first level of access. As mentioned above, a request for action may comprise a request to perform an attack (e.g., an injection attack, a search attack, a privilege escalation attack, and/or other attack). In some examples, the request engine 221 may send requests to be performed in the application in a manner the same as or similar to that of the application auditing instructions 122 of system 100. Further details regarding an example implementation of request engine 221 are provided above in connection with application auditing instructions 121 of FIG. 1.

Request performing engine 222 may perform the first request and the second request. In some examples, the request performing engine 222 may perform requests in the application in a manner the same as or similar to that of the application auditing instructions 122 of system 100. Further details regarding an example implementation of request performing engine 222 are provided above in connection with application auditing instructions 121 of FIG. 1.

Results engine 223 may determine the results of the performed first request and performed second request, combine the results of the performed first request and the performed second request, and make available the combined results. In some examples, the results engine 223 may determine, combine, and make available results from the performed requests in a manner the same as or similar to that of the application auditing instructions 122 of system 100. Further details regarding an example implementation of results engine 223 are provided above in connection with application auditing instructions 121 of FIG. 1.

Figure 3:
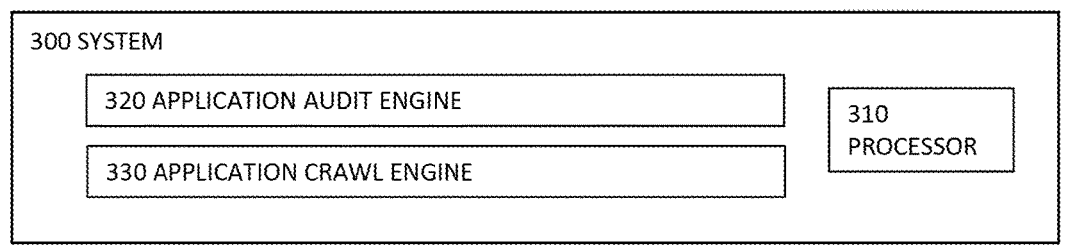
FIG. 3 is a flowchart of an example system for automated multi-credential assessment.

FIG. 3 is a block diagram of an example system for automated multi-credential assessment. As illustrated in FIG. 3 and described below, system 300 may comprise a processor 310, a non-transitory machine readable storage medium, a series of engines 320-330 for automated multi-credential assessment, and/or other components.

As with processor 110 of FIG. 1, processor 310 may be one or more CPUs, microprocessors, and/or other hardware devices suitable for retrieval and execution of instructions. As with machine-readable storage medium 120, non-transitory machine-readable storage medium may be any hardware storage device for maintaining data accessible to system 300. As with engines 220, engines 320-330 may generally represent any combination of hardware and programming.

Non-transitory machine-readable storage medium of FIG. 3 may be the same as or similar to the storage medium 120 of FIG. 1. Non-transitory machine-readable storage medium of FIG. 3 may maintain and/or store data and information related to automated multi-credential assessment. The storage medium of FIG. 3 may store, for example, a set of resources of the application, a set of roles via which the application may be accessed, a set of privilege levels, where each privilege level is associated with a predetermined role, a set of attacks to be performed at each privilege level, and/or other information related to automated multi-credential assessment of the application. In some examples, the information stored by non-transitory machine-readable storage medium may be the same as or similar to information stored by non-transitory machine-readable storage medium 120

Application auditing engine 320 may perform functionality the same as or similar to that of the application auditing engine 220 of system 200. Further details regarding an example implementation of application auditing engine 320 are provided above in connection with application auditing engine 220 of system 200.

Application crawling engine 330 may perform functionality the same as or similar to that of the application auditing engine 220 of FIG. 2. In some examples, application crawling engine 330 may crawl the application before auditing the application, wherein crawling the application comprises performing a separate crawl of the application for each privilege level of the application. Further details regarding an example implementation of application crawling engine 330 are provided above in connection with application auditing engine 220 of FIG. 2.

System 300 may perform other functionality related to automated multi-credential assessment as well and is not limited to the examples of automated multi-credential assessment functionality described herein.

Figure 4:
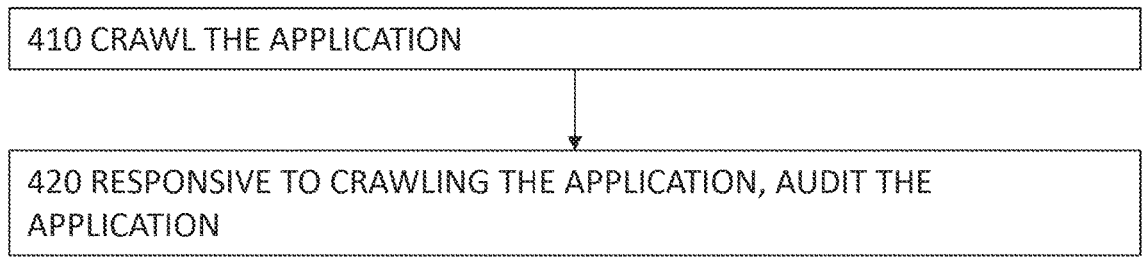
FIG. 4 is a flowchart of an example method for automated multi-credential assessment.

FIG. 4 is a flowchart of an example method for execution by a computing device for automated multi-credential assessment.

Although execution of the methods described below are with reference to system 100 of FIG. 1 system 200 of FIG. 2, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 410, the application may be crawled. For example, the system 100 (and/or the application auditing instructions 121, the application auditing engine 220, or other resource of the system 100) may crawl the application. The system 100 may crawl the application in a manner similar or the same as that described above in relation to the execution of the process monitoring instructions 121, the application auditing engine 220, application crawling engine 330, and/or other resource of the system 100.

In an operation 420, audit the application responsive to crawling the application. For example, the system 100 (and/or the process monitoring instructions 121, the process monitoring engine 220, or other resource of the system 100) may audit the application. The system 100 may audit the application in a manner similar or the same as that described above in relation to the execution of the application auditing instructions 121, the application auditing engine 220, or other resource of the system 100.

Figure 4A:
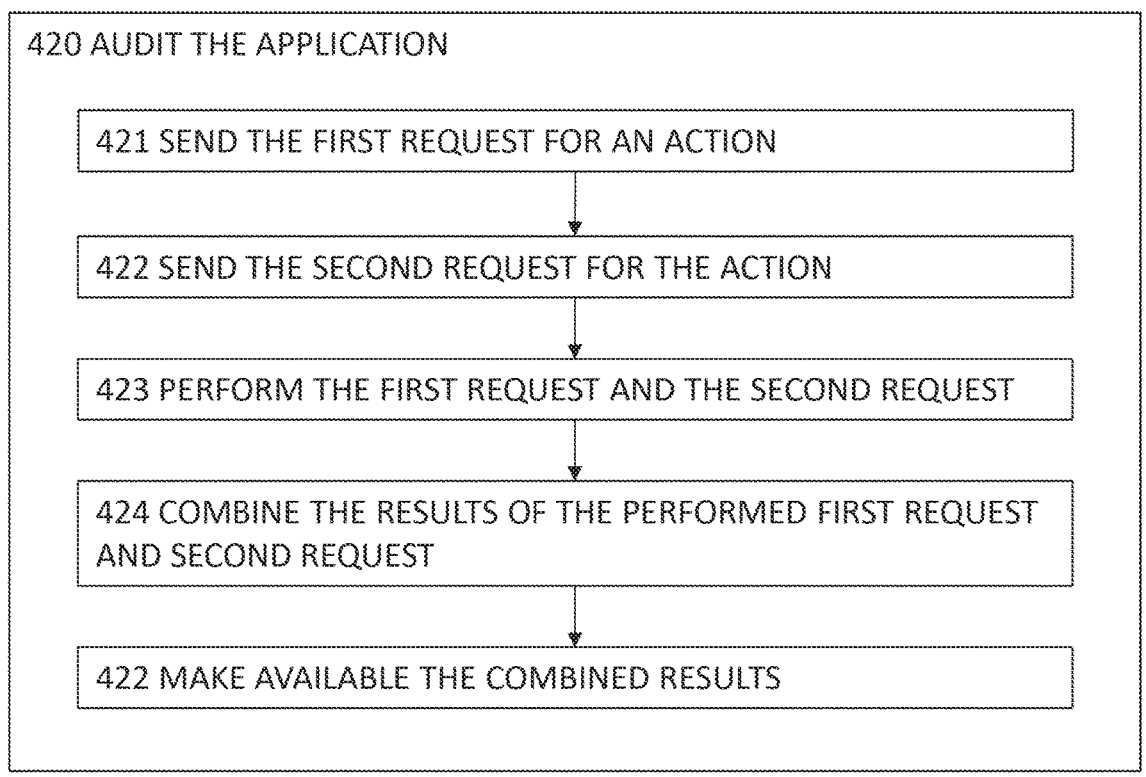
FIG. 4A is a flowchart of an example method for auditing an application to perform automated multi-credential assessment.

In some examples, operation 420 may be performed in a manner described by FIG. 4A. FIG. 4A is a flowchart of an example method for execution by a computing device for auditing an application to perform automated multi-credential assessment.

In an operation 421, a first request for an action to be performed in the application may be sent, wherein the first privilege level corresponds with a first level of access to the application. For example, the system 100 (and/or the process monitoring instructions 121, the process monitoring engine 220, or other resource of the system 100) may send the first request for the action. The system 100 may send the first request for the action in a manner similar or the same as that described above in relation to the execution of the application auditing instructions 121, the application auditing engine 220, or other resource of the system 100.

In an operation 422, a second request for the action to be performed in the application may be sent, wherein the second privilege level corresponds with a second level of access to the application, and wherein the second privilege level corresponds with a second level of access to the application different from the first level of access. For example, the system 100 (and/or the process monitoring instructions 121, the process monitoring engine 220, or other resource of the system 100) may send the second request for the action. The system 100 may send the second request for the action in a manner similar or the same as that described above in relation to the execution of the application auditing instructions 121, the application auditing engine 220, or other resource of the system 100.

In an operation 423, the first request and second request may be performed. For example, the system 100 (and/or the process monitoring instructions 121, the process monitoring engine 220, or other resource of the system 100) may perform the first request and the second request. The system 100 may perform the first request and second request in a manner similar or the same as that described above in relation to the execution of the application auditing instructions 121, the application auditing engine 220, or other resource of the system 100.

In an operation 424, the results of the performed first request and second request may be combined. For example, the system 100 (and/or the process monitoring instructions 121, the process monitoring engine 220, or other resource of the system 100) may combine the results of the performed first request and second request. The system 100 may combine the results of the performed first request and second request in a manner similar or the same as that described above in relation to the execution of the application auditing instructions 121, the application auditing engine 220, or other resource of the system 100.

In an operation 425, the combined results may be made available. For example, the system 100 (and/or the process monitoring instructions 121, the process monitoring engine 220, or other resource of the system 100) may make available the combined results. The system 100 may make available the combined results in a manner similar or the same as that described above in relation to the execution of the application auditing instructions 121, the application auditing engine 220, or other resource of the system 100.

The foregoing disclosure describes a number of example embodiments for automated multi-credential assessment. The disclosed examples may include systems, devices, computer-readable storage media, and methods for automated multi-credential assessment. For purposes of explanation, certain examples are described with reference to the components illustrated in FIGS. 1-4A. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-4A are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A system comprising:
   a physical processor; and
   a non-transitory machine-readable storage medium storing instructions executable on the physical processor to:
   perform a plurality of crawls of a program at respective different privilege levels, the plurality of crawls comprising a first crawl of the program at a first privilege level, and a second crawl of the program at a different second privilege level;

responsive to the plurality of crawls, provide information indicating that a first resource is accessible at the first privilege level and inaccessible at the second privilege level;
audit the program by:
sending a first request for an action to be performed in the program, the first request based on the first privilege level that corresponds to a first level of access to the program;
sending a second request for the action to be performed in the program, the second request based on the second privilege level that corresponds to a second level of access to the program different from the first level of access;
obtaining a first result of the action performed in response to the first request, and obtaining a second result of the action performed in response to the second request, the second result indicating that the first resource was accessed by the action performed in response to the second request, and indicating an alert relating to a vulnerability at the second privilege level;
combining the first and second results to produce a combined result; and
making available the combined result.

2. The system of claim 1, wherein the plurality of crawls are performed before the auditing.

3. The system of claim 2, wherein the instructions are executable on the physical processor to:
perform the plurality of crawls of the program in order from a lowest privilege level of the different privilege levels to a highest privilege level of the different privilege levels.

4. The system of claim 1, wherein the instructions are executable on the physical processor to audit the program by:
sending a first set of requests for an action to detect web application vulnerabilities based on the first privilege level, the first set of requests comprising the first request.

5. The system of claim 1, wherein the action specified by each of the first request and the second request comprises an injection attack.

6. The system of claim 1, wherein the action specified by each of the first request and the second request comprises a privilege escalation attack.

7. The system of claim 1, wherein the instructions are executable on the physical processor to:
send the second request responsive to determining that the first request should be sent.

8. The system of claim 1, wherein the instructions are executable on the physical processor to:
determine, based on the information provided responsive to the plurality of crawls, that the first resource should not have been accessed by the action performed in response to the second request; and
include the alert in the second result responsive to determining that the first resource should not have been accessed by the action performed in response to the second request.

9. The system of claim 1, wherein the action comprises an injection attack, and wherein the instructions are executable on the physical processor to:
determine, based on the information provided responsive to the plurality of crawls, that the first resource should not have been accessed by the injection attack performed in response to the second request; and
include the alert in the second result responsive to determining that the first resource should not have been accessed by the injection attack performed in response to the second request.

10. The system of claim 1, wherein the second privilege level is less comprehensive in resource access than the first privilege level.

11. A method executed by a system comprising a physical processor, the method comprising:
crawling an application in a plurality of crawls of the application at respective different privilege levels, the plurality of crawls comprising a first crawl of the application at a first privilege level, and a second crawl of the application at a different second privilege level;
responsive to the plurality of crawls, providing information indicating that a first resource is accessible at the first privilege level and inaccessible at the second privilege level;
after the crawling of the application, auditing the application by:
sending a first request for an action to be performed in the application, the first request based on the first privilege level that corresponds to a first level of access to the application;
sending a second request for the action to be performed in the application, the second request based on the second privilege level that corresponds to a second level of access to the application different from the first level of access;
obtaining a first result of the action performed in response to the first request, and obtaining a second result of the action performed in response to the second request, the second result indicating that the first resource was accessed by the action performed in response to the second request, and indicating an alert relating to a vulnerability at the second privilege level;
combining the first and second results to produce a combined result; and
making available the combined result.

12. The method of claim 11, wherein the action specified by each of the first request and the second request comprises a privilege escalation attack.

13. The method of claim 11, further comprising:
determining, based on the information provided responsive to the plurality of crawls, that the first resource should not have been accessed by the action performed in response to the second request; and
including the alert in the second result responsive to determining that the first resource should not have been accessed by the action performed in response to the second request.

14. The method of claim 11, wherein the action comprises an injection attack, and the method further comprising:
determining, based on the information provided responsive to the plurality of crawls, that the first resource should not have been accessed by the injection attack performed in response to the second request; and
including the alert in the second result responsive to determining that the first resource should not have been accessed by the injection attack performed in response to the second request.

15. The method of claim 11, wherein the second privilege level is less comprehensive in resource access than the first privilege level.

16. The method of claim 11, wherein the plurality of crawls are in order from a lowest privilege level of the different privilege levels to a highest privilege level of the different privilege levels.

17. A non-transitory machine-readable storage medium comprising instructions that upon execution cause a system to:
perform a plurality of crawls of a program at respective different privilege levels, the plurality of crawls comprising a first crawl of the program at a first privilege level, and a second crawl of the program at a different second privilege level;
responsive to the plurality of crawls, provide information indicating that a first resource is accessible at the first privilege level and inaccessible at the second privilege level;
audit the program by:
sending a first request for an action to be performed in the program, the first request based on the first privilege level that corresponds to a first level of access to the program;
sending a second request for the action to be performed in the program, the second request based on the second privilege level that corresponds to a second level of access to the program that is less comprehensive than the first level of access;
obtaining a first result of the action performed in response to the first request, and obtaining a second result of the action performed in response to the second request, the second result indicating that the first resource was accessed by the action performed in response to the second request, and indicating an alert relating to a vulnerability at the second privilege level;
combining the first and second results to produce a combined result; and
making available the combined result.

18. The non-transitory machine-readable storage medium of claim 17, wherein the instructions upon execution cause the system to:
determine, based on the information provided responsive to the plurality of crawls, that the first resource should not have been accessed by the action performed in response to the second request; and
include the alert in the second result responsive to determining that the first resource should not have been accessed by the action performed in response to the second request.

19. The non-transitory machine-readable storage medium of claim 17, wherein the action comprises an injection attack, and wherein the instructions upon execution cause the system to:
determine, based on the information provided responsive to the plurality of crawls, that the first resource should not have been accessed by the injection attack performed in response to the second request; and
include the alert in the second result responsive to determining that the first resource should not have been accessed by the injection attack performed in response to the second request.

20. The non-transitory machine-readable storage medium of claim 17, wherein the instructions upon execution cause the system to:
perform the plurality of crawls in order from a lowest privilege level of the different privilege levels to a highest privilege level of the different privilege levels.

* * * * *